(12) United States Patent
Thome

(10) Patent No.: US 10,922,749 B1
(45) Date of Patent: Feb. 16, 2021

(54) REAL-TIME PAYMENT CARD TRANSACTION ROUTING BIDDING PLATFORM

(71) Applicant: Katherine Thome, Austin, TX (US)

(72) Inventor: Katherine Thome, Austin, TX (US)

( * ) Notice: Subject to any disclaimer, the term of this patent is extended or adjusted under 35 U.S.C. 154(b) by 491 days.

(21) Appl. No.: 15/794,855

(22) Filed: Oct. 26, 2017

(51) Int. Cl.
*G06Q 40/00* (2012.01)
*G06Q 30/08* (2012.01)
*G06Q 40/04* (2012.01)
*G06Q 30/06* (2012.01)

(52) U.S. Cl.
CPC ............. *G06Q 30/08* (2013.01); *G06Q 30/06* (2013.01); *G06Q 40/04* (2013.01)

(58) Field of Classification Search
CPC ......... G06Q 30/08; G06Q 30/06; G06Q 40/04
See application file for complete search history.

(56) References Cited

U.S. PATENT DOCUMENTS

| | | | | |
|---|---|---|---|---|
| 6,999,943 B1* | 2/2006 | Johnson | ................. | G06Q 20/10 705/35 |
| 7,702,540 B1* | 4/2010 | Woolston | ............... | G06Q 20/10 705/26.3 |
| 2007/0090183 A1* | 4/2007 | Hursta | ................... | G06Q 20/20 235/380 |
| 2010/0100474 A1* | 4/2010 | Van Slyke | ............. | G06Q 40/04 705/37 |
| 2015/0371324 A1* | 12/2015 | Kumar | ................... | G06F 15/00 705/26.3 |

OTHER PUBLICATIONS

Managing online auctions: Current business and research issues Pinker, Edieal J; Seidmann, Abraham; Vakrat, Yaniv. Management Science; Linthicum vol. 49, Iss. 11, (Nov. 2003): 1457-1484. (Year: 2003).*

* cited by examiner

*Primary Examiner* — Lalita M Hamilton
(74) *Attorney, Agent, or Firm* — Plager Schack LLP; Mark H. Plager; Stephen Hallberg

(57) ABSTRACT

A real-time payment card transaction routing bidding platform is disclosed that identifies a payment card transaction routing offer that satisfies a set of transaction routing criteria including at least one of a low transaction cost, a high transaction volume, a high network throughput, and a particular data security level. The real-time payment card transaction routing bidding platform is utilized by merchants using Internet-based systems to allow universal access to transaction bidding and to free small merchants from long and inflexible acquirer pricing contracts. In this way, the platform reduces cost by allow pricing to be dictated dynamically in the marketplace.

8 Claims, 8 Drawing Sheets

BIDDING INTERFACE - NETWORK

| MERCHANT TYPE | TRANSACTION | # TRANSACTIONS | BID | MIN BID | BID TYPE | CORRECT BID |
|---|---|---|---|---|---|---|
| ELECTRONICS RETAILER | $25-50 | 500 | $0.0004 | $0.0003 | 1 WEEK | $0.0003 |
| DRUG STORE PHARMACY | <$4.00 | ALL | 0.002% | 0.001% | 1 DAY | 0.001% |

BIDDING INTERFACE - MERCHANT

| MAX ACCEPTABLE BID | | | |
|---|---|---|---|
| % | $ | OPTIMIZE | NETWORK PREFERENCE |
| 0.005 | $0.002 | ☑ | NONE |

REAL-TIME PAYMENT CARD TRANSACTION ROUTING BIDDING PLATFORM

BACKGROUND

Embodiments of the invention described in this specification relate generally to transaction routing, and more particularly, to a real-time payment card transaction route bidding platform system and processes.

Currently merchants in the United States (U.S.) must route payment card transactions at pre-negotiated and fixed rates set by BIN tables and their acquiring bank or processor. Large merchants have the market power to route and negotiate favorable fixed rates with issuing banks and card networks. Smaller merchants rely on a merchant acquirer/processor to do the same function and often pay higher transaction costs because they lack the ability to benefit from the scale of larger merchants. This does not allow the system to flex pricing during peak season (holiday shopping) or to create variable incentives between merchants and issuing banks on interchange as the existing agreements are complex contracts involving extensive commitments and negotiations. Pricing is less elastic and higher than it would otherwise be.

Among the existing options, the most dynamic system is to route payment card transactions based on pre-agreed pricing and by BIN tables. However, this is problematic for many merchants, as noted above, and is less efficient from a market-perspective because the existing transaction routing options are based on pre-negotiated pricing that does not adjust in real time and is, therefore, inelastic. Among the many merchants for whom this is a problem, small merchants in particular cannot benefit from this system.

Therefore, what is needed is a for merchants to be able to tap into more dynamic, flexible, and elastic transaction routing options.

BRIEF DESCRIPTION

A system and processes are disclosed for a real-time payment card transaction routing bidding platform that identifies a payment card transaction routing offer that satisfies a set of transaction routing criteria. In some embodiments, the set of transaction routing criteria comprises at least one of a low transaction cost, a high transaction volume, a high network throughput, and a particular data security level.

Some embodiments include a novel a real-time payment card transaction routing bidding system that allows merchants and merchant banks to bid on card network offers to route payments for transactions completed by payment cards of card networks. Some embodiments include a real-time merchant bidding process performed from a merchant side of the real-time payment card transaction routing bidding system. Some embodiments include a real-time card network bidding process performed from a card network side of the real-time payment card transaction routing bidding system.

In some embodiments, the real-time payment card transaction routing bidding system is implemented as a cloud-computing network-based real-time payment card transaction routing bidding system that provides a real-time card payment transaction routing bidding service that supports a real-time card payment transaction routing bidding marketplace in which merchants and card networks bid on routing for payment card transactions. In some embodiments, the real-time payment card transaction routing bidding system includes a cloud-network merchant-side server for merchant computing devices to connect to over a private cloud network in order to generate merchant bids and actively participate in the marketplace. In some embodiments, the real-time payment card transaction routing bidding system includes a cloud-network payment card network server for payment card network computing devices to connect to over a private cloud network in order to generate payment card network bids and actively participate in the marketplace. In some embodiments, the real-time payment card transaction routing bidding system includes a cloud-network realtime payment card transaction route bidding server from which at least one instance of the real-time transaction payment bid matching and routing engine and a web server run to host the realtime payment card transaction route bidding cloud application service and actively perform marketplace functions in relation to the bids and offers being made in real-time by the marketplace participants. In some embodiments, the real-time payment card transaction routing bidding system also includes a plurality of real-time payment card transaction route bidding databases.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 2 conceptually illustrates an example of a payment card network bidding interface in some embodiments.

FIG. 3 conceptually illustrates an example of a merchant bidding interface in some embodiments.

DETAILED DESCRIPTION

Figure 1:
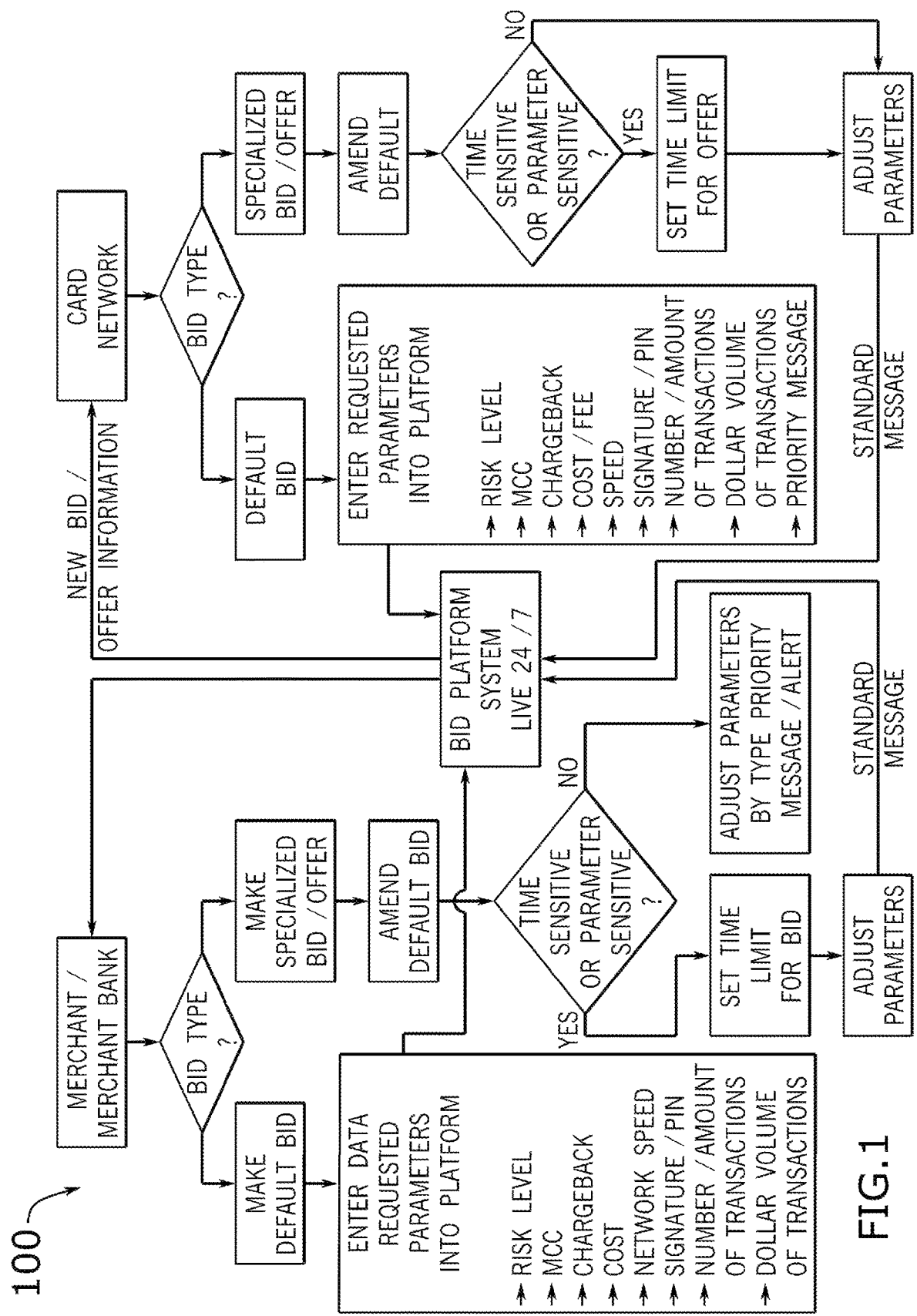
FIG. 1 conceptually illustrates a real-time payment card transaction route bidding platform that supports real-time payment card transaction route bidding and offering by merchants and payment card networks in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel a real-time payment card transaction routing bidding platform that identifies a payment card transaction routing offer that satisfies a set of transaction routing criteria. In some embodiments, the set of transaction routing criteria comprises at least one of a low transaction cost, a high transaction volume, a high network throughput, and a particular data security level. The low transaction cost criteria is a typical metric utilized in efforts to minimize costs. The high transaction volume criteria is a metric commonly visited during peak transaction times, such as the ends of sale quarters when major payment card issuers strive to maximize transaction volume for the benefit of other financial health indicators, such as stock price. The high network throughput criteria is a metric of importance when transaction volume is expected to be high, such that the network bandwidth is sufficient great to handle simultaneous or contemporaneous processing and completion of the high volume of expected transactions. The particular data security level criteria is a metric of concern for consumer, bank, card issuer, and merchant data privacy.

Some embodiments include a novel a real-time payment card transaction routing bidding system that allows merchants and merchant banks to bid on card network offers to route payments for transactions completed by payment cards of card networks. Some embodiments include a real-time merchant bidding process performed from a merchant side of the real-time payment card transaction routing bidding system. Some embodiments include a real-time card network bidding process performed from a card network side of the real-time payment card transaction routing bidding system.

In some embodiments, the real-time payment card transaction routing bidding system is implemented as a cloud-computing network-based real-time payment card transaction routing bidding system that provides a real-time card payment transaction routing bidding service that supports a real-time card payment transaction routing bidding marketplace in which merchants and card networks bid on routing for payment card transactions. In some embodiments, the real-time payment card transaction routing bidding system includes a cloud-network merchant-side server for merchant computing devices to connect to over a private cloud network in order to generate merchant bids and actively participate in the marketplace. In some embodiments, the real-time payment card transaction routing bidding system includes a cloud-network payment card network server for payment card network computing devices to connect to over a private cloud network in order to generate payment card network bids and actively participate in the marketplace. In some embodiments, the real-time payment card transaction routing bidding system includes a cloud-network realtime payment card transaction route bidding server from which at least one instance of the real-time transaction payment bid matching and routing engine and a web server run to host the realtime payment card transaction route bidding cloud application service and actively perform marketplace functions in relation to the bids and offers being made in real-time by the marketplace participants. In some embodiments, the real-time payment card transaction routing bidding system also includes a plurality of real-time payment card transaction route bidding databases.

As stated above, currently merchants in the U.S. must route payment card transaction at pre-negotiated and fixed rates set by BIN tables and their acquiring bank or processor. Large merchants have the market power to route and negotiate favorable fixed rates with issuing banks and card networks. Smaller merchants rely on a merchant acquirer/processor to do the same function and often pay higher transaction costs because they lack the ability to benefit from the scale of larger merchants. This does not allow the system to flex pricing during peak season (holiday shopping) or to create variable incentives between merchants and issuing banks on interchange as the existing agreements are complex contracts involving extensive commitments and negotiations. Pricing is less elastic and higher than it would otherwise be. Embodiments of the real-time payment card transaction routing bidding platform described in this specification solve such problems by a real-time bidding engine that allows networks to bid based on transaction type and volume. If a network were looking to increase traffic from grocery stores in order to incentivize top-of-wallet status with a card hardler, they could bid to take lower fees for a transaction flowing across their network. Likewise, an issuer could agree to accept less than the published network interchange reimbursement. The merchant would be plugged into the platform and the transaction would flow to the lowest cost option for the merchant. So rather than saying all pricing from merchant x is interchange+1 bids per second (hereinafter "bids per second" is abbreviated as "bps" or as "BPS"), bidders would say we accept volume from merchant type x at the reduced rate of (interchange rate+0.5 bps) for a predetermined period of time. Alternatively a merchant could place a request for a cost and allow networks to accept the reduced rate for routing preference or hold to a pre-existing price as a default.

Embodiments of the real-time payment card transaction routing bidding platform described in this specification differ from and improve upon currently existing options. In particular, some embodiments of the real-time payment card transaction routing bidding platform differ by supporting dynamic bid pricing in real-time. In contrast, none of the existing options include ways for transactions to be routed based on dynamic bid pricing in real time. In addition, some embodiments of the real-time payment card transaction routing bidding platform improve upon the currently existing options because the costs for merchants and consumers reflect higher transaction processing costs in the existing systems. These costs decrease margins for retailers and place a strain on their ability to accept electronic payments. However, the real-time payment card transaction routing bidding platform of the present disclosure can be implemented as an online, cloud-based network system which supports real time bidding by merchants using real-time online payment systems (such as Square), thereby allowing more universal access to transaction bidding. In some embodiments, the real-time payment card transaction routing bidding platform could also free small merchants from long and inflexible acquirer pricing contracts. Thus, the real-time payment card transaction routing bidding platform has the ability to reduce costs overall by allowing pricing to be dictated dynamically similar to online adword bidding.

In this way, the real-time payment card transaction routing bidding platform provides an efficient on-line real-time bidding platform and marketplace which merchants can access and utilize by merchant-side proprietary software solutions or commercial offerings, such as Square, thereby allowing more universal access to transaction bidding in the marketplace, and which reduces the constraints of long and inflexible acquirer pricing contracts on small merchants and reduces costs by allowing dynamic, real-time, marketplace pricing to be determined by market forces.

Several more detailed embodiments are described in the sections below. Section I describes a real-time payment card transaction routing bidding platform. Section II describes some real-time payment card transaction routing bidding processes. Section III describes a network architecture of a cloud-computing real-time payment card transaction routing bidding system. Section IV describes an electronic system that implements some embodiments of the invention.

I. Real-Time Payment Card Transaction Routing Bidding Platform

The real-time payment card transaction routing bidding platform may be comprised of the following elements. This list of possible constituent elements is intended to be exemplary only and it is not intended that this list be used to limit the real-time payment card transaction routing bidding platform to just these elements. Persons having ordinary skill in the art relevant to the present disclosure may understand there to be equivalent elements that may be substituted within the present disclosure without changing the essential function or operation of the real-time payment card transaction routing bidding platform.

1. Real-time bidding platform
2. Access protocol overlays

The real-time bidding platform and the access protocol overlays of the real-time payment card transaction routing bidding platform creates a system that uses all parts of the payment value chain to optimize pricing based on real-time market demand. Merchants (and/or merchant banks) use the system, such that if a merchant has entered preferred pricing, a floor is set in the marketplace. Processors, acquirers, networks and issuers (referred collectively as payment card network) may all bid to conform to the merchant's price. This allows each participant to enter the marketplace in preferred terms and optimizes cost across the payment value chain. The real-time payment card transaction routing bidding platform decides where the final transaction will route.

By way of example, FIG. 1 conceptually illustrates a real-time payment card transaction routing bidding platform 100 that supports real-time payment card transaction route bidding and offering by merchants and payment card network entities. To make the real-time payment card transaction routing bidding platform 100, a (software) builder may use HTML, PHP, or other internet open source development language to create an interface which all participants can access (or any other suitable programming and/or scripting language). The interface may be designed with fields for default bids/offers. Examples of default fields include, without limitation, risk level, transaction type, merchant type, MCC code, issuer interchange reimbursement, network processing fee, chargeback rights, costs, merchant/acquirer fees, network speed, signature/PIN, number/amount of transactions, dates and times, currency for bidding, and the dollar volume of transactions, among others. The software builder may code the interfaces in any way that allows merchant users and payment card network users to use the system and to route the transaction based on the winning bid. For instance, the software builder may code the interfaces as front-layer UI components that are visibly output on monitors for users to interact with while underlying processes are performed on the processing units/processors of client computing devices and cloud server computers. For instance, one underlying process may include a coded implementation of the process as a decision tree to route the transaction based on the winning bid.

Turning now to FIG. 2, which conceptually illustrates an example of a payment card network bidding interface 200. While the payment card network bidding interface 200 is only an example of a payment card network user interface, a person skilled in the relevant art would appreciate that the interface can be implemented as a user interface (UI) or as a graphical user interface (GUI) of a real-time payment card network bidding software application that implements a real-time payment card network bidding process, such as the real-time payment card network bidding process 800, described below by reference to FIG. 8.

As shown in FIG. 2, the payment card network bidding interface 200 includes headings for "MERCHANT TYPE", "TRANSACTION", "#TRANSACTIONS", "BID", "MIN BID", "BID TYPE", and "CORRECT BID". The payment card network bidding interface 200 also includes data fields with data input under the headings, namely "ELECTRONICS RETAILER" and "DRUG STORE PHARMACY" for "MERCHANT TYPE", "$25-50" and "<$4.00" for "TRANSACTION", "500" and "ALL" for "#TRANSACTIONS", "$0.0004" and "0.002%" for "BID", "$0.0003" and "0.001%" for "MIN BID", "1 WEEK" and "1 DAY" for "BID TYPE", and "$0.0003" and "0.001%" for "CORRECT BID".

Another example interface is described by reference to FIG. 3, which conceptually illustrates an example of a merchant bidding interface 300. While the merchant bidding interface 300 is only an example of a merchant user interface, a person skilled in the relevant art would appreciate that the interface can be implemented as a user interface (UI) or as a graphical user interface (GUI) of a real-time payment card network bidding software application that implements a real-time merchant bidding process, such as the real-time merchant bidding process 700, described below by reference to FIG. 7.

As shown in FIG. 3, the merchant bidding interface 300 includes one bid with an overhanging heading labeled "MAX ACCEPTABLE BID". Several sub-headings are included, including "%", "$", "OPTIMIZE", and "NETWORK PREFERENCE". The merchant bidding interface 300 also includes data fields with data input under the sub-headings, namely "0.005" for "%", "$0.002" for "$", a checked box for "OPTIMIZE", and "NONE" for "NETWORK PREFERENCE".

II. Real-Time Payment Card Transaction Routing Bidding Processes

Figure 4:
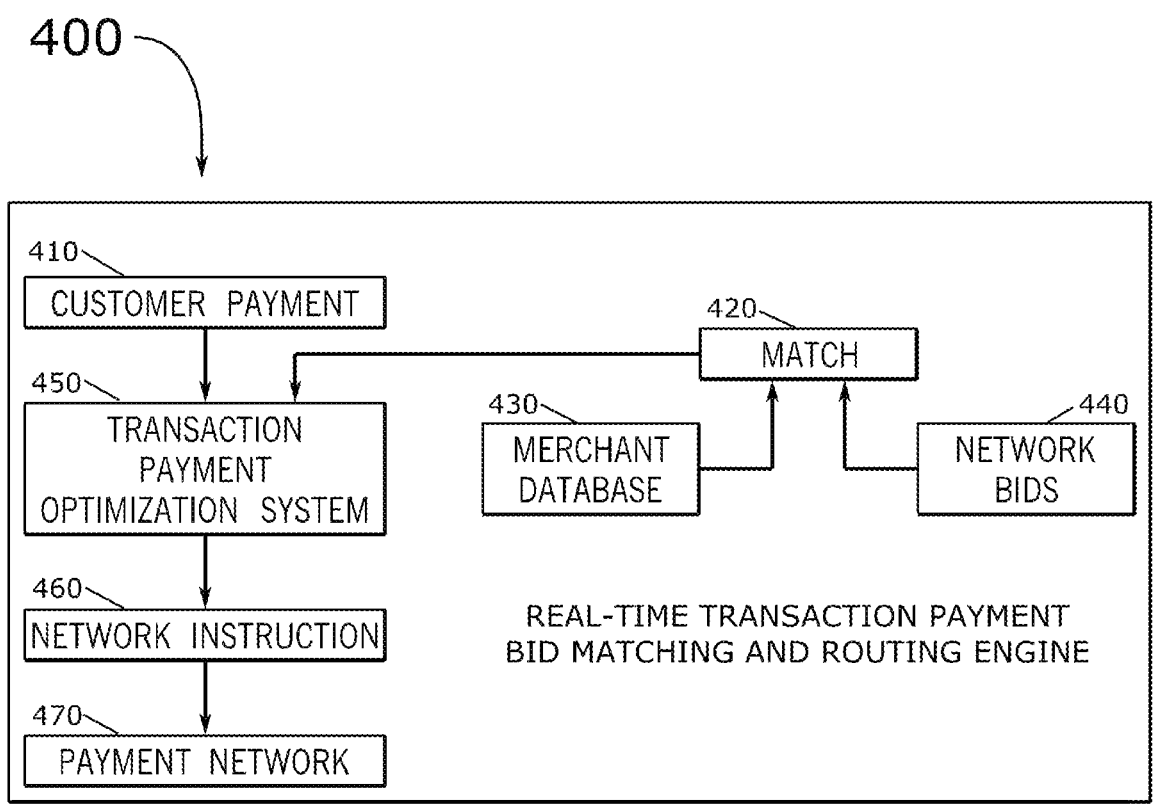
FIG. 4 conceptually illustrates a real-time transaction payment bid matching and routing engine in some embodiments.

Now turning to FIG. 4, a real-time transaction payment bid matching and routing engine 400 is conceptually illustrated. As shown in this figure, the real-time transaction payment bid matching and routing engine 400 includes a bid/offer/message flow that demonstrates how the real-time transaction payment bid matching and routing engine 400 optimizes marketplace routing of consumer card payments by matching bids and offers for type, costs/fees, time, etc. Specifically, the real-time transaction payment bid matching and routing engine 400 begins optimizing when a customer payment 410 is received. A matching module 420 that performs one or more merchant/network bid matching algorithms identifies matches of bids and offers from a merchant database 430, such as merchant route bidding database 960 described by reference to FIG. 9 below, and from a network bids database 440, such as payment card network route bidding database 980, also described below by reference to FIG. 9. While performing the matching algorithm(s), the matching module 420 takes into account all of the default and/or the specialized bid parameter data in each bid/offer. When completed, a bid is identified as a best matching bid and the matching module 420 passes the identified match to a transaction payment optimization system 450. The transaction payment optimization system 450 then routes the customer payment 410 according to the best route, providing a network instruction 460 to optimize routing to a payment network 470.

Message timing for the real-time payment card transaction route bidding platform is described next. Specifically, FIG. 5 conceptually illustrates a priority messaging process 500 and FIG. 6 conceptually illustrates a standard messaging process 600.

Figure 5:
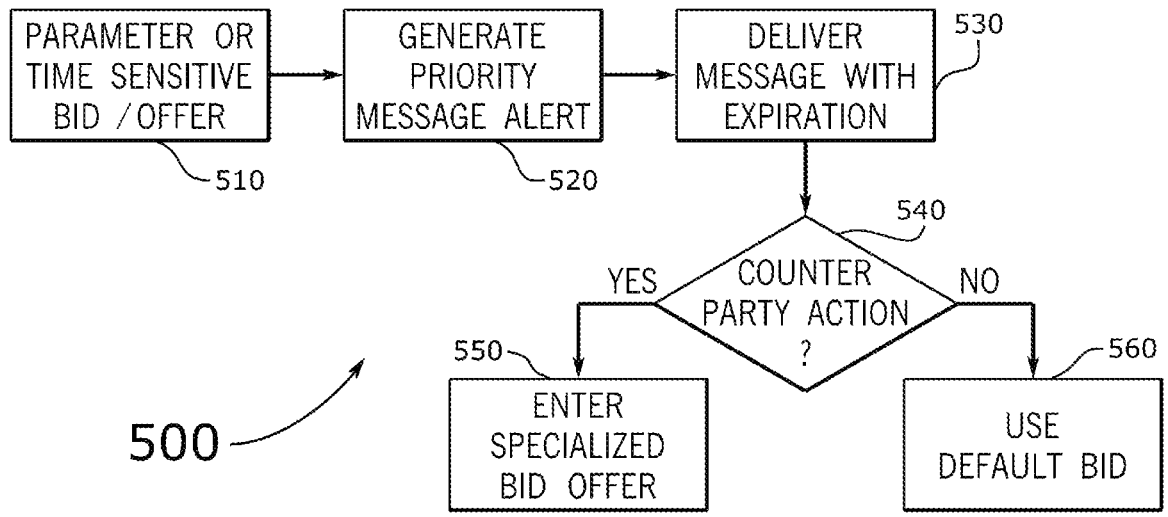
FIG. 5 conceptually illustrates a priority messaging process in some embodiments.

Referring first to FIG. 5, the priority messaging process 500 starts (at 510) with a parameter or time sensitive bid/offer. Next, the priority messaging process 500 of some embodiments generates (at 520) a priority message alert, and then delivers (at 530) the message alert with an expiration date. For example, the merchant may have specified a time-limited bid by providing an expiration date or by indicating a time duration to remain active (e.g., one day, one week, etc.). In some embodiments, the priority messaging process 500 determines (at 540) whether there is a counter party action or not. When there is a counter party action, then the priority messaging process 500 enters (at 550) the specialized bid/offer. On the other hand, where there is no counter party action, then the priority messaging process 500 simply uses the default bid/offer (560).

Figure 6:
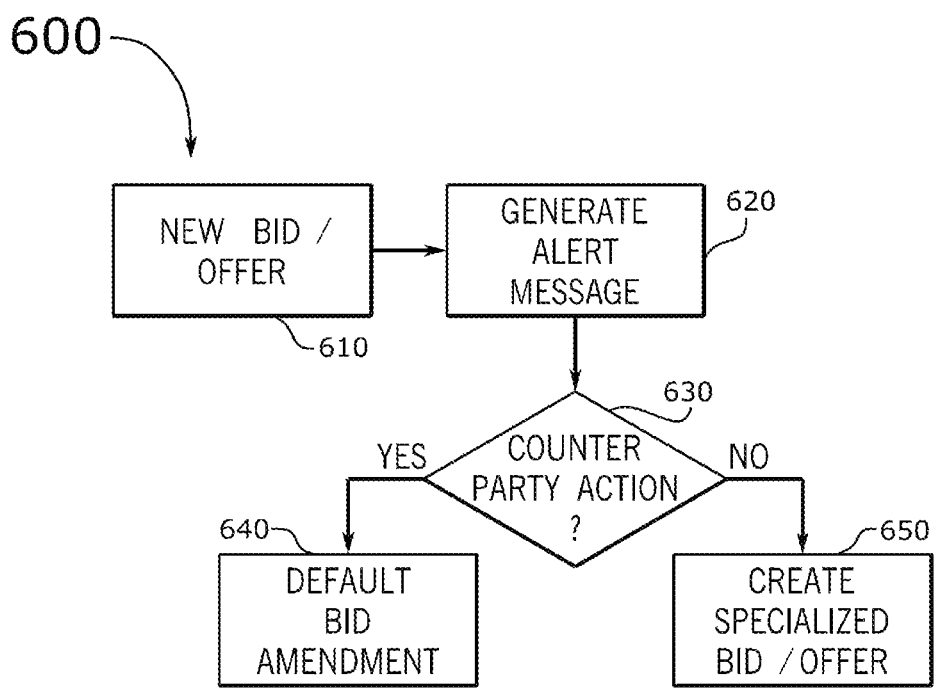
FIG. 6 conceptually illustrates a standard messaging process in some embodiments.

Now turning to FIG. 6, the standard messaging process 600 starts (at 610) with a new bid/offer. Next, the standard messaging process 600 of some embodiments generates (at 620) an alert message. In some embodiments, the standard messaging process 600 determines (at 630) whether there is a counter party action or not. When there is a counter party action, then the standard messaging process 600 makes a default bid/offer amendment (at 640). On the other hand, where there is no counter party action, then the standard messaging process 600 creates (at 650) a specialized bid/offer.

Figure 7:
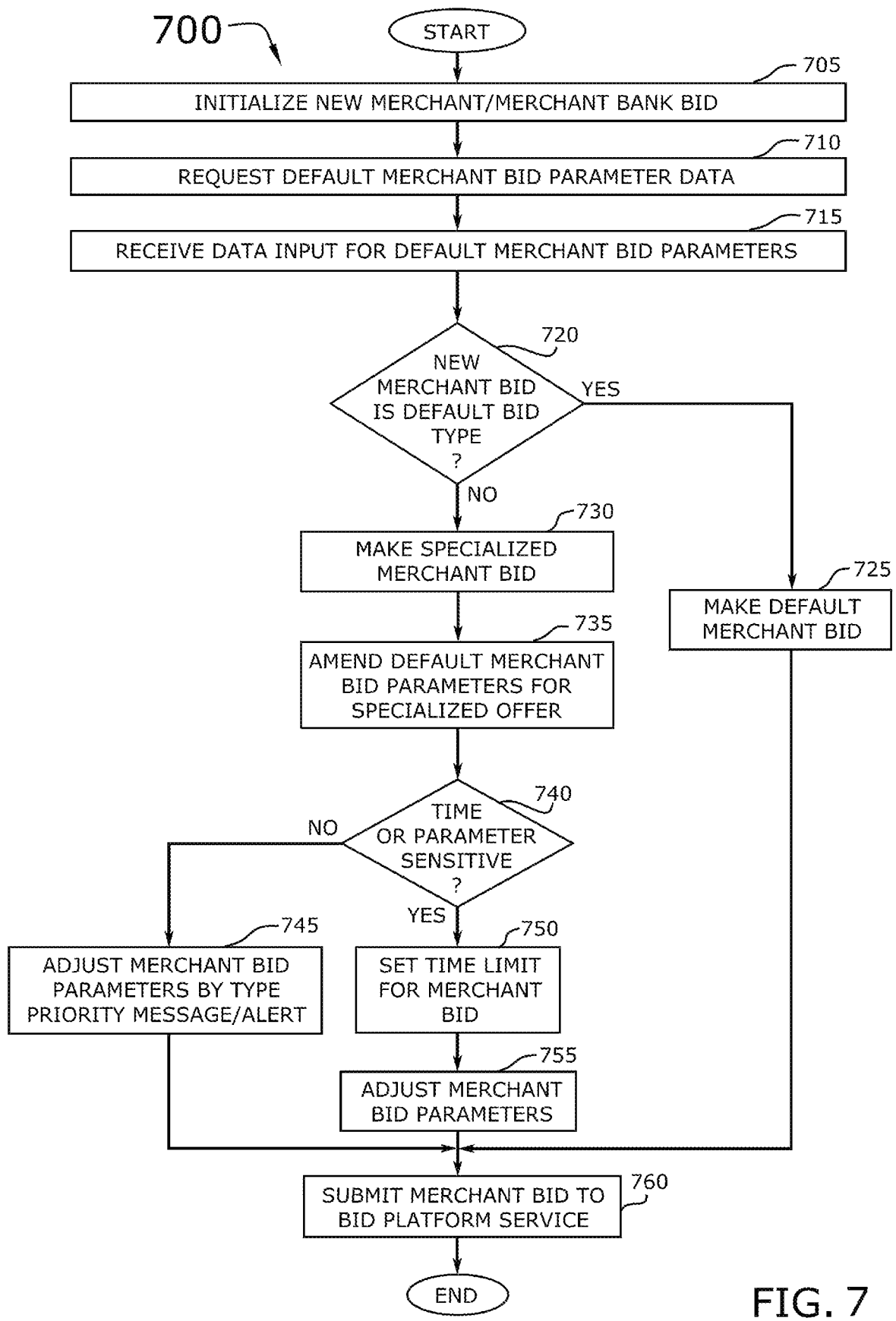
FIG. 7 conceptually illustrates a real-time merchant bidding process in some embodiments.

By way of example, FIG. 7 conceptually illustrates a real-time merchant bidding process 700. As shown in this figure, the real-time merchant bidding process 700 starts by initializing (at 705) a new merchant bid. Next, the real-time merchant bidding process 700 requests (at 710) default merchant bid data for a plurality of merchant bid parameters. Examples of merchant bid parameters include, without limitation, transaction type, merchant type, MCC code, issuer interchange reimbursement, network processing fee, chargeback rights, merchant/acquirer fees, number of transactions, dates and times, and currency for bidding, among other parameters relevant to the bidding. In some embodiments, the real-time merchant bidding process 700 receives (at 715) data input for the requested default merchant bid data for the plurality of merchant bid parameters.

In some embodiments, the real-time merchant bidding process 700 determines (at 720) whether the new merchant bid is a default bid type or not. When the new merchant bid is affirmatively determined to be a default bid type, then the real-time merchant bidding process 700 makes (at 725) the default merchant bid. To make the default bid, the real-time merchant bidding process 700 of some embodiments uses the received data input for the requested default merchant bid data. After making the default merchant bid, the real-time merchant bidding process 700 submits the merchant bid (at 760) to the bid platform service. Submitting the merchant bid to the bid platform service is described in further detail below.

Referring back to the determination (at 720) of whether the new merchant bid is a default bid type or not, when the real-time merchant bidding process 700 negatively determines that the bid is not a default merchant bid, then the real-time merchant bidding process 700 moves forward to make the bid a specialized merchant bid (at 730). To make the bid a specialized merchant bid, the real-time merchant bidding process 700 amends (at 735) the default merchant bid parameters for a specialized offer. The real-time merchant bidding process 700 also determines (at 740) whether the bid is time or parameter sensitive. When the bid is not time or parameter sensitive, the real-time merchant bidding process 700 of some embodiments adjusts (at 745) the merchant bid parameters by type priority message/alert.

On the other hand, when the bid is affirmatively determined to be time or parameter sensitive, then the real-time merchant bidding process 700 sets a time limit (at 750) for merchant bid. For example, the merchant bid may be time sensitive, set to expire after one week, one month, one day, etc. Next, the real-time merchant bidding process 700 adjusts (at 755) the merchant bid parameters. In some embodiments, the real-time merchant bidding process 700 then submits (at 760) the merchant bid (default or specialized) to the bid platform service. Then the real-time merchant bidding process 700 ends.

Figure 8:
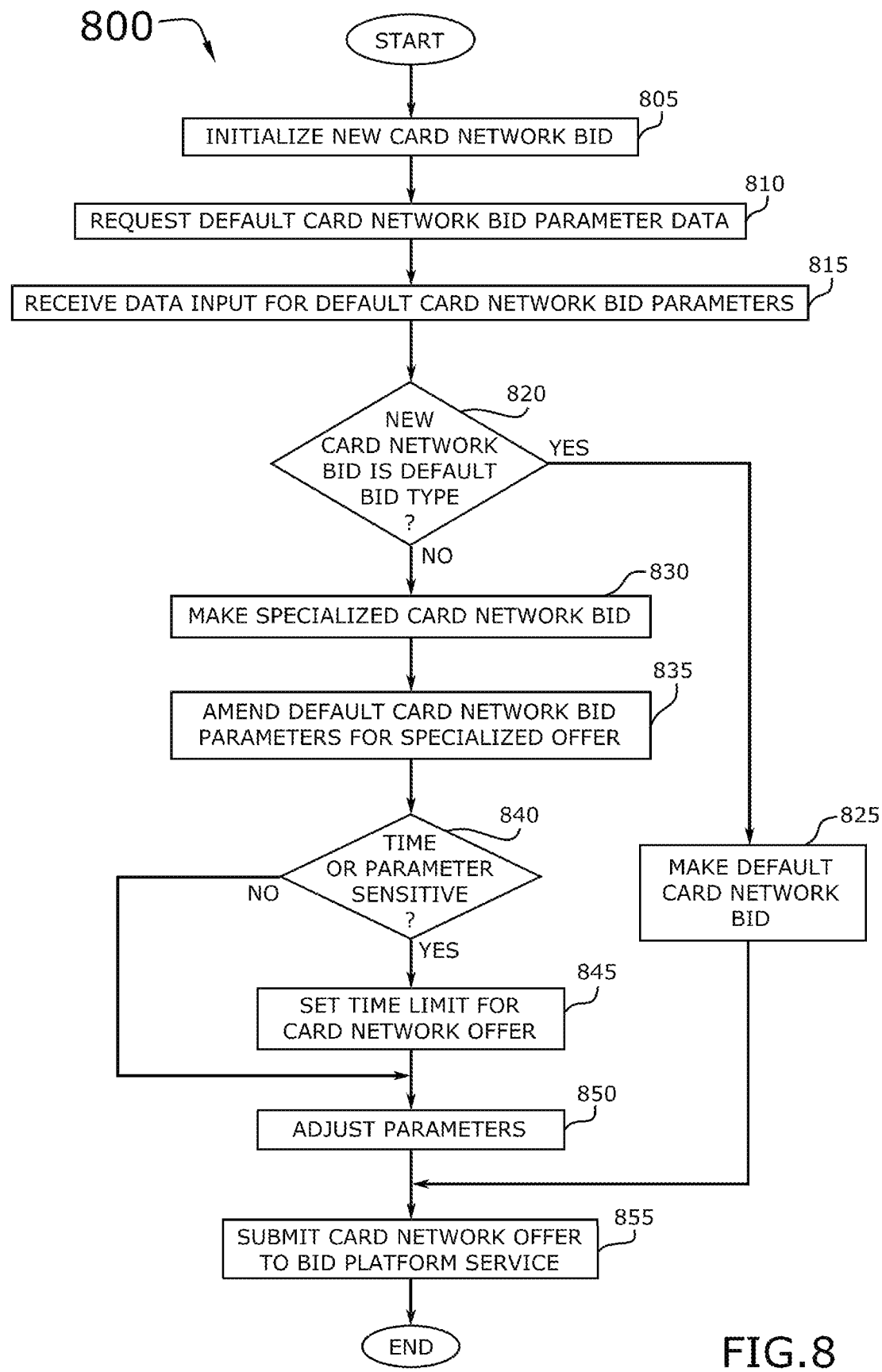
FIG. 8 conceptually illustrates a real-time payment card network bidding process in some embodiments.

By way of example, FIG. 8 conceptually illustrates a real-time payment card bidding process 800. As shown in this figure, the real-time payment card bidding process 800 starts by initializing (at 805) new card network bid and requesting (at 810) default card network bid parameter data. Next, the real-time payment card bidding process 800 receives (at 815) data input for the default card network bid parameters. Examples of default card network bid parameters include, without limitation, risk level, MCC code, chargeback account, costs/fees, network speed, signature/PIN, number or amount of transactions, dollar volume of transactions, priority messages, etc.

After receiving data input for the default card network bid parameters, the real-time payment card bidding process 800 determines (at 820) whether the new card network bid is a default bid type or not. When the new card network is affirmatively determined to be a default bid type, then the real-time payment card bidding process 800 makes a default card network bid (at 825), using the received data that was input for the requested default card network bid parameters. The real-time payment card bidding process 800 of some embodiments then submits (at 855) a card network offer to the bid platform service. Submitting the card network offer to the bid platform service is described further below.

On the other hand, when the new card network is negatively determined not to be a default bid type, then the real-time payment card bidding process 800 makes a specialized card network bid (at 830). To make the bid a specialized card network bid, the real-time payment card bidding process 800 of some embodiments amends (at 835) the default card network bid parameters for a specialized offer. The real-time payment card bidding process 800 of some embodiments also determines (at 840) whether the specialized offer is time or parameter sensitive. When the specialized offer is negatively determined not to be time or parameter sensitive, then the real-time payment card bidding process 800 moves ahead to adjust (at 850) the parameters, which is described further below. However, when the specialized offer is affirmatively determined to be time or parameter sensitive, then the real-time payment card bidding process 800 sets a time limit (at 845) for the card network offer. After setting the time limit, the real-time payment card bidding process 800 adjusts (at 850) the data input for the plurality of default parameters.

Next, the real-time payment card bidding process 800 of some embodiments submits (at 855) the card network offer to the bid platform service. Then the real-time payment card bidding process 800 ends.

III. Network Architecture of a Cloud-Computing Real-Time Payment Card Transaction Routing Bidding System In some embodiments, the real-time bidding platform and the access protocol overlays of the real-time payment card transaction routing bidding platform create a real-time payment card transaction routing bidding platform by way of a real-time cloud-computing network-based real-time payment card transaction routing bidding system that uses all parts of the payment value chain to optimize pricing based on real-time market demand. The real-time payment card transaction routing bidding system may include the following elements. This list of possible constituent elements is intended to be exemplary only and it is not intended that this list be used to limit the real-time payment card transaction routing bidding system of the present application to just these elements. Persons having ordinary skill in the art relevant to the present disclosure may understand there to be equivalent elements that may be substituted within the present disclosure without changing the essential function or operation of the real-time payment card transaction routing bidding system.

1. Real-time payment card transaction route bidding cloud server(s)
2. Access protocol overlays
3. Real-time payment card transaction route bidding databases
4. Merchant bid processing cloud server(s)
5. Payment card network bid offer processing cloud server(s)
6. Merchant and merchant bank computing devices (clients)
7. Payment card network computing devices (clients)

In some embodiments, the real-time payment card transaction routing bidding system operates in real-time or in near real-time, by participants accessing the real-time engine. If a merchant has entered preferred pricing, a floor is set in the marketplace. Network entities may all bid to conform to the merchant's price. This allows each participant to enter the marketplace in preferred terms and optimizes cost across the payment value chain. In some embodiments, the real-time transaction payment bid matching and routing engine of the real-time payment card transaction routing bidding system decides where the final transaction will route.

Figure 9:
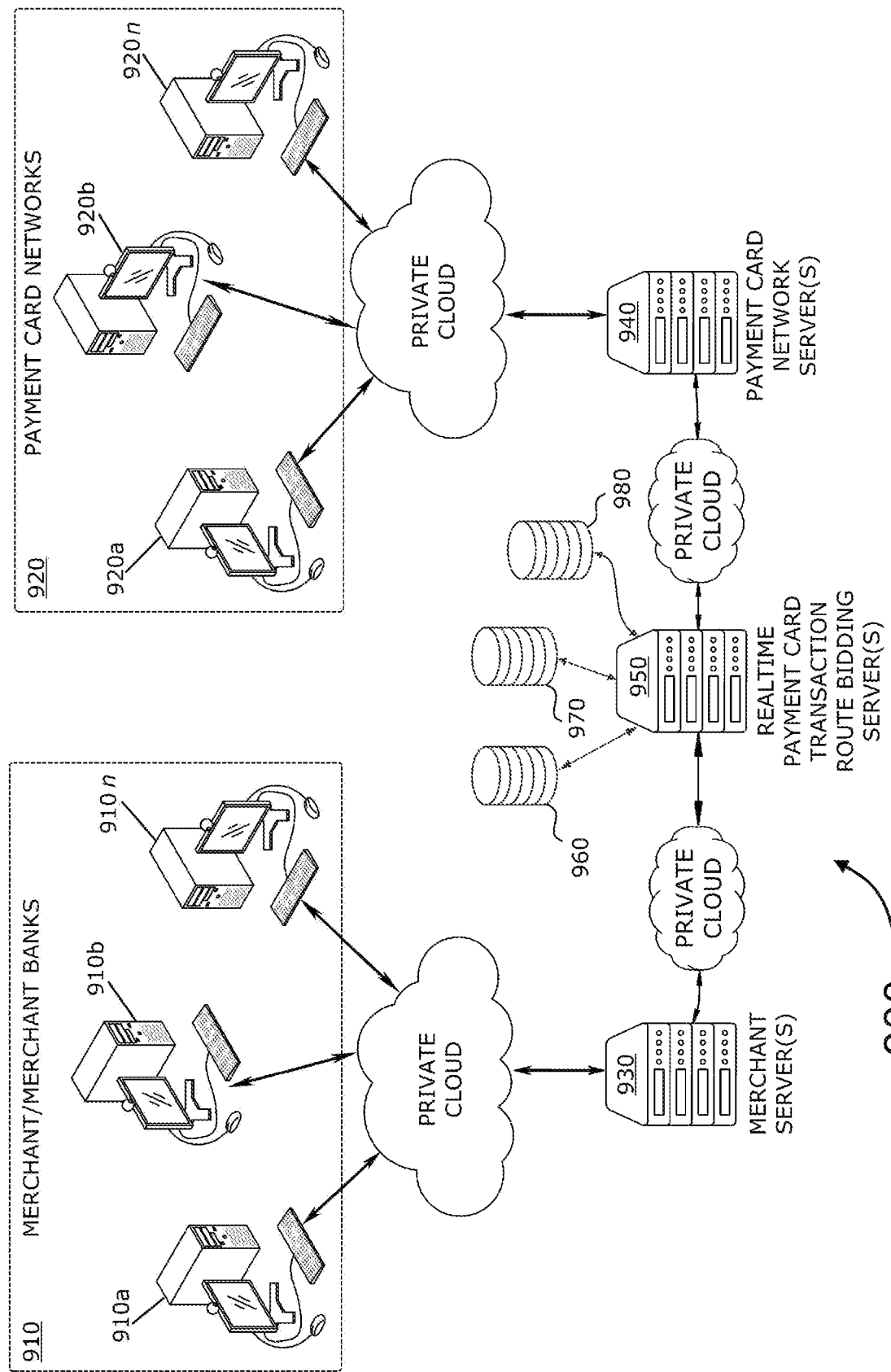
FIG. 9 conceptually illustrates a cloud-computing network architecture of a real-time payment card transaction route bidding system in some embodiments.

By way of example, FIG. 9 conceptually illustrates a cloud-computing network-based real-time payment card transaction routing bidding system 900. As shown in this figure, the real-time payment card transaction routing bidding system 900 includes a plurality of merchant or merchant bank computing devices 910 (hereinafter "merchant computing devices 910") comprising a first merchant computing device 910*a*, a second merchant computing device 910*b*, . . . , and a last merchant computing device 910*n*, where the last merchant computing device 910*n* can be continually a greater or lesser number depending upon the number of merchants presently active in the marketplace.

The real-time payment card transaction routing bidding system 900 also includes a plurality of payment card network computing devices 920, including a first payment card network computing device 920*a*, a second payment card network computing device 920*b*, . . . , and a last payment card computing device 920*n*, where the last payment card network computing device 920*n* can be continually a greater or lesser number depending on the number of payment card network entities active in the marketplace.

In addition to the merchant computing devices 910*a*, 910*b*, . . . , 910*n* and the payment card network computing devices 920*a*, 920*b*, . . . , 920*n*, the real-time payment card transaction routing bidding system 900 includes one or more cloud-network merchant servers 930 which each merchant computing device 910*a*, 910*b*, . . . , 910*n* connects to over a private cloud network in order to generate merchant bids and actively participate in the marketplace. The real-time payment card transaction routing bidding system 900 also includes one or more cloud-network payment card network servers 940 which each payment card network computing device 920*a*, 920*b*, . . . , 920*n* connects to over a private cloud network in order to generate payment card network bids and actively participate in the marketplace.

The real-time payment card transaction routing bidding system 900 also includes one or more cloud-network real-time payment card transaction route bidding servers 950. In some embodiments, the cloud-network realtime payment card transaction route bidding servers 950 include at least one instance of the real-time transaction payment bid matching and routing engine 400 and at least one web server to which the merchant servers 930 and the payment card network servers 940 are communicably connected over private cloud networks to host a realtime payment card transaction route bidding cloud application service that actively performs marketplace functions in relation to the bids and offers being made in real-time by the marketplace participants (i.e., the merchants and the networks).

In some embodiments, the real-time payment card transaction routing bidding system 900 includes a plurality of real-time payment card transaction route bidding databases comprising a merchant route bidding database 960, a real-time marketplace transaction and payment routing map database 970, and a payment card network route bidding database 980.

To use the real-time payment card transaction routing bidding system 900, participants log into the marketplace through their cloud server access point. For example, merchants log into the marketplace via the merchant server(s) 930 while payment card network entities log into the marketplace via the payment card network server(s) 940. When merchants and networks make bids/offers (e.g., manually or by an automated method), the bids/offers are transmitted to the realtime payment card transaction route bidding server(s) 950, which includes at least once instance of the real-time transaction payment bid matching and routing engine 400. The marketplace would accept bids through RSS feeds and batch methods. The marketplace owner and administrator may charge a portion of the discount to the merchant in order to support the cost. Alternatively, a larger organization could use the service as a value added differentiator for use of a payment processing gateway.

IV. Electronic System

The above-described embodiments of the invention are presented for purposes of illustration and not of limitation. In addition, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic, electronic, or optical storage, which can be read into memory for processing by a processor. Also, in some embodiments, multiple software inventions can be implemented as sub-parts of a larger program while remaining distinct software inventions. In some embodiments, multiple software inventions can also be implemented as separate, possibly interacting, programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
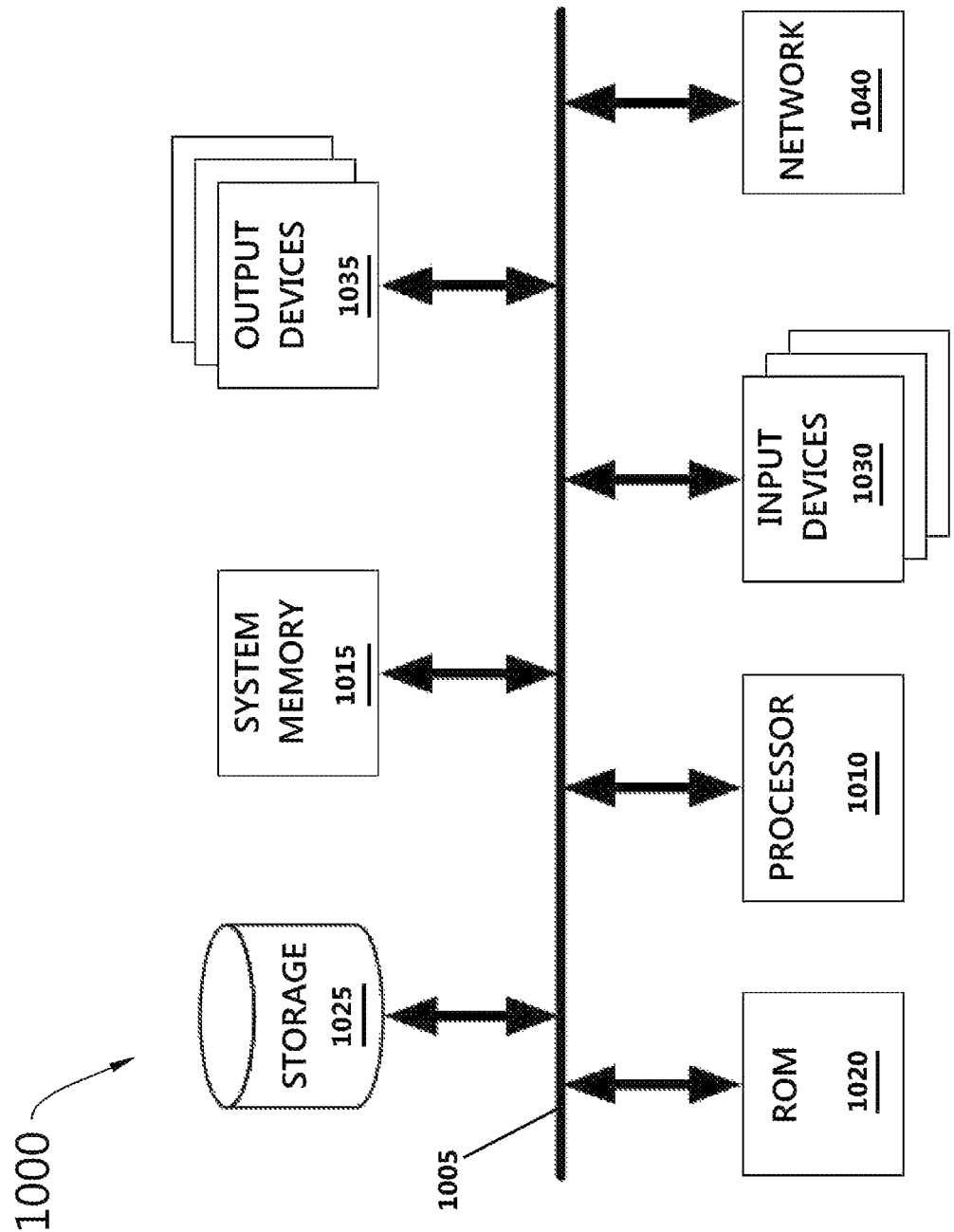
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer, phone, PDA, or any other sort of electronic device. Such an electronic system includes various types of computer readable media and interfaces for various other types of computer readable media. Electronic system 1000 includes a bus 1005, processing unit(s) 1010, a system memory 1015, a read-only 1020, a permanent storage device 1025, input devices 1030, output devices 1035, and a network 1040.

The bus 1005 collectively represents all system, peripheral, and chipset buses that communicatively connect the numerous internal devices of the electronic system 1000. For example, the bus 1005 communicatively connects the processing unit(s) 1010 with the read-only memory 1020, the system (ephemeral) memory 1015, and the permanent storage device 1025.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1020 stores static data and instructions that are needed by the processing unit(s) 1010 and other modules of the electronic system. The permanent storage device 1025 is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk or a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the invention's processes are stored in the system memory 1015, the permanent storage device 1025, and/or the read-only 1020. For example, the various memory units include instructions for processing appearance alterations of displayable characters in accordance with some embodiments. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images generated by the electronic system 1000. The output devices 1035 include printers and display devices, such as cathode ray tubes (CRT) or liquid crystal displays (LCD). Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For example, FIGS. 1 and 4-8 conceptually illustrate methods or processes. The specific operations of each method or process may not be performed in the exact order shown and described. Specific operations may not be performed in one continuous series of operations, and different specific operations may be performed in different embodiments. Furthermore, each method or process could be implemented using several sub-routine methods or processes, or as part of a larger macro method or process. Thus, one of ordinary skill in the art would understand that the invention is not to be limited by the foregoing illustrative details, but rather is to be defined by the appended claims.

I claim:

1. A real-time payment card transaction routing bidding system that supports a real-time card payment transaction routing bidding marketplace for merchants to bid on card network offers to route payment card transaction payments, said real-time payment card transaction routing bidding system comprising:
   a merchant-side server for merchant computing devices to connect to over a private cloud merchant network in order to generate merchant bids and actively participate in a real-time payment card transaction routing bidding marketplace, wherein the merchant-side server comprises a processing unit and a program comprising sets of instructions for generating merchant bids, wherein the sets of instructions are executed on the processing unit for each merchant bid including (i) initializing a new merchant bid associated with a particular merchant computing device, (ii) receiving a set of data input for a set of default merchant bid parameters of the new merchant bid, wherein the set of data input relate to a particular merchant bid, generated by the particular merchant computing device, to route one or more payment card transactions, and (iii) submitting the particular merchant bid for inclusion in the real-time payment card transaction routing bidding marketplace;
   a payment card network server for payment card network computing devices to connect to over a private cloud payment card issuer network in order to generate payment card network bids and actively participate in the real-time payment card transaction routing bidding marketplace;
   a real-time payment card transaction route bidding server that hosts a real-time payment card transaction route bidding cloud application service that provides a platform for merchants and payment card networks to make marketplace transaction routing bids in real-time while connected to the real-time payment card transaction route bidding cloud application service via merchant computing devices and payment card network computing devices, wherein the real-time payment card transaction route bidding server comprises a transaction payment optimization system that receives customer payments and routes the customer payments according to network instructions to a payment network, wherein the real-time payment card transaction route bidding server further comprises a matching engine that identifies matching merchant data received from a merchant database with marketplace transaction routing bids made by payment card networks and provides the identified matches to the transaction payment optimization system to use as network instructions for customer payments in the payment network, wherein the payment network communicably connects the merchant-side server and the payment card network server to the real-time payment card transaction route bidding server via encrypted private cloud connections; and
   a plurality of real-time payment card transaction route bidding databases comprising a merchant route bidding database that stores exclusive marketplace transaction routing offers made by merchants, a real-time marketplace transaction and payment routing map database that stores routing information about customer payments and the network instructions for routing the customer payments to the payment network, and a payment card network route bidding database that stores exclusive marketplace transaction routing bids made by payment card networks bidding to route customer payments to the payment network.

2. The real-time payment card transaction routing bidding system of claim 1 further comprising a real-time transaction payment bid matching and routing engine to actively perform marketplace functions in relation to bids and offers being made in real-time by marketplace participants.

3. The real-time payment card transaction routing bidding system of claim 1, wherein each marketplace transaction routing bid includes a set of transaction routing criteria comprising at least one of a low transaction cost, a high transaction volume, a high network throughput, and a particular data security level.

4. The real-time payment card transaction routing bidding system of claim 1, wherein each marketplace transaction routing bid comprises one of a default set of bid information and a specialized set of bid information.

5. The real-time payment card transaction routing bidding system of claim 4, wherein the specialized set of bid information comprises one of a time sensitivity and a parameter sensitivity.

6. The real-time payment card transaction routing bidding system of claim 1, wherein the program further comprises a set of instructions for amending a time duration of the particular merchant bid to limit the time duration to a particular holiday shopping season.

7. The real-time payment card transaction routing bidding system of claim 6, wherein the particular merchant bid is made into a specialized merchant bid comprising a time sensitivity.

8. The real-time payment card transaction routing bidding system of claim 7, wherein the program further comprises a set of instructions for adjusting a message priority and alert parameter based on the time sensitivity of the specialized merchant bid being limited to the particular holiday shopping season.

* * * * *